US011895459B2

(12) United States Patent
Hasegawa

(10) Patent No.: US 11,895,459 B2
(45) Date of Patent: Feb. 6, 2024

(54) SOUND OUTPUT DEVICE

(71) Applicant: SONY GROUP CORPORATION, Tokyo (JP)

(72) Inventor: Masayoshi Hasegawa, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 138 days.

(21) Appl. No.: 17/596,540

(22) PCT Filed: May 14, 2020

(86) PCT No.: PCT/JP2020/019221
§ 371 (c)(1),
(2) Date: Dec. 13, 2021

(87) PCT Pub. No.: WO2020/255596
PCT Pub. Date: Dec. 24, 2020

(65) Prior Publication Data

US 2022/0248126 A1 Aug. 4, 2022

(30) Foreign Application Priority Data

Jun. 21, 2019 (JP) ................................ 2019-115318

(51) Int. Cl.
*H04R 1/26* (2006.01)
*H04R 1/10* (2006.01)
*G10K 11/178* (2006.01)

(52) U.S. Cl.
CPC ......... *H04R 1/26* (2013.01); *G10K 11/17881* (2018.01); *H04R 1/1016* (2013.01);
(Continued)

(58) Field of Classification Search
CPC ...... H04R 1/1016; H04R 1/26; H04R 1/1075; H04R 1/1083; G10K 11/17881;
(Continued)

(56) References Cited

U.S. PATENT DOCUMENTS 11,741,938 B2 * 8/2023 Asada .................. H04R 1/1083 381/71.6
2014/0205131 A1 * 7/2014 Azmi .................. H04R 1/1066 381/380
(Continued)

FOREIGN PATENT DOCUMENTS

JP 2011-175113 A 9/2011
JP 2013-026746 A 2/2013
WO 2019/035304 A1 2/2019

OTHER PUBLICATIONS

International Search Report and Written Opinion of PCT Application No. PCT/JP2020/019221, dated Aug. 11, 2020, 08 pages of ISRWO.

*Primary Examiner* — David L Ton
(74) *Attorney, Agent, or Firm* — CHIP LAW GROUP

(57) ABSTRACT

The present invention includes: a housing that includes an arrangement case in which an internal space is formed, and a sound guide tube in which a sound conduction space is formed; a feedback microphone to which an external sound is input; a first speaker unit that outputs a sound; and a second speaker unit that outputs a sound in an output band different from an output band of the sound output from the first speaker unit. The housing has inside a first space and a second space, the feedback microphone and the first speaker unit are arranged in the first space, the second speaker unit is arranged in the second space, and an equalizer that partitions the first space and the second space is disposed between the first speaker unit and the second speaker unit.

7 Claims, 3 Drawing Sheets

(52) U.S. Cl.
CPC ......... *H04R 1/1075* (2013.01); *H04R 1/1083* (2013.01); *G10K 2210/1081* (2013.01); *G10K 2210/3026* (2013.01); *G10K 2210/3027* (2013.01); *H04R 2460/01* (2013.01)

(58) Field of Classification Search
CPC ... G10K 2210/1081; G10K 2210/3026; G10K 2210/3027
See application file for complete search history.

(56) References Cited

U.S. PATENT DOCUMENTS

| | | | | |
|---|---|---|---|---|
| 2019/0164532 | A1* | 5/2019 | Eguchi ................. | H04R 1/1083 |
| 2020/0251086 | A1* | 8/2020 | Tobise ............. | G10K 11/17827 |

* cited by examiner

SOUND OUTPUT DEVICE

CROSS REFERENCE TO RELATED APPLICATIONS

This application is a U.S. National Phase of International Patent Application No. PCT/JP2020/019221 filed on May 14, 2020, which claims priority benefit of Japanese Patent Application No. JP 2019-115318 filed in the Japan Patent Office on Jun. 21, 2019. Each of the above-referenced applications is hereby incorporated herein by reference in its entirety.

TECHNICAL FIELD

The present technology relates to a technical field of a sound output device including a first speaker unit and a second speaker unit which are different in sound output bands.

BACKGROUND ART

There is a sound output device that is worn on a head or an ear for use as headphones or earphones and outputs sound from a speaker.

In the sound output device, it is preferable to ensure an output state of broadband sounds, and the quality of sound heard by a user is improved by outputting broadband sounds.

In order to output such broadband sounds, there is a sound output device including a plurality of speaker units provided inside a housing (see, for example, Patent Document 1). In such a sound output device, the plurality of speaker units has different sound output bands, which enables output of broadband sounds. The sound output device disclosed in Patent Document 1 is provided with, for example, two dynamic speaker units.

Further, the sound output device having a configuration including the plurality of speaker units as described above may be provided with a feedback microphone to which an external sound is input as noise, and may have a so-called noise canceling function for ensuring high-quality sound by canceling noise input to the feedback microphone.

CITATION LIST

Patent Document

Patent Document 1: Japanese Patent Application Laid-Open No. 2013-26746

SUMMARY OF THE INVENTION

Problems to be Solved by the Invention

Meanwhile, in a sound output device such as headphone or earphones having a plurality of speaker units as described above, the plurality of speaker units outputs sounds in different bands. Therefore, it is possible to improve the quality of sound by outputting broadband sounds.

Further, in the sound output device having a noise canceling function, it is also desirable to improve sound quality by improving the quality of sounds output from the plurality of speaker units due to the noise canceling function being appropriately executed.

In view of this, an object of the sound output device according to the present technology is to improve sound quality and enhance performance of a noise canceling function.

Solutions to Problems

First, a sound output device according to the present technology includes: a housing that includes an arrangement case in which an internal space is formed, and a sound guide tube in which a sound conduction space is formed; a feedback microphone to which an external sound is input; a first speaker unit that outputs a sound; and a second speaker unit that outputs a sound in an output band different from an output band of the sound output from the first speaker unit, in which the housing has inside a first space and a second space, the feedback microphone and the first speaker unit are arranged in the first space, the second speaker unit is arranged in the second space, and an equalizer that partitions the first space and the second space is disposed between the first speaker unit and the second speaker unit.

With this configuration, the first space in which the feedback microphone and the first speaker unit are arranged and the second space in which the second speaker unit is arranged are partitioned by the equalizer, whereby the sound output from the second speaker unit is less likely to be input to the feedback microphone.

Secondly, in the sound output device described above, it is desirable that the second speaker unit is arranged in the conduction space.

This configuration eliminates the need to form a dedicated space for arranging the second speaker unit inside the housing.

Thirdly, in the sound output device described above, it is desirable that the feedback microphone and the first speaker unit are held by the sound guide tube.

This configuration eliminates the need to arrange separate members for respectively holding the feedback microphone and the first speaker unit.

Fourthly, in the sound output device described above, it is desirable that the sound guide tube is provided with a partition wall between the feedback microphone and the first speaker unit, the partition wall is formed with a communication hole that allows communication between the feedback microphone and the first speaker unit, and the communication hole penetrates in a direction perpendicular to an axial direction of the sound guide tube.

With this configuration, the direction in which the communication hole penetrates and the direction in which the conduction space extends are perpendicular to each other, which prevents the sound guide tube from being excessively long in one direction.

Fifthly, in the sound output device described above, it is desirable that the first speaker unit and the second speaker unit are arranged apart from each other in the axial direction of the sound guide tube.

With this configuration, the first speaker unit and the second speaker unit are positioned apart from each other in the axial direction of the sound guide tube inside the sound guide tube, whereby the space inside the sound guide tube is effectively used.

Sixthly, in the sound output device described above, it is desirable that the first speaker unit and the feedback microphone are arranged apart from each other in the direction perpendicular to the axial direction of the sound guide tube.

With this configuration, the first speaker unit and the second speaker unit are positioned apart from each other in the axial direction of the sound guide tube, and the first speaker unit and the feedback microphone are positioned apart from each other in the direction perpendicular to the axial direction of the sound guide tube. Thus, the first speaker unit, the second speaker unit, and the feedback microphone are not aligned in one direction.

Seventhly, in the sound output device described above, it is desirable that a diaphragm of the first speaker unit and the equalizer are positioned to face each other.

This configuration prevents an increase in size of the sound guide tube in the direction in which the diaphragm and the first equalizer are arranged.

MODE FOR CARRYING OUT THE INVENTION

Hereinafter, a mode for embodying the sound output device according to the present technology will be described with reference to the accompanying drawings.

In the embodiment described below, the sound output device according to the present technology is applied to headphones. However, the present technology is not limited to be applied to headphones, and can be widely applied to various other sound output devices such as earphones.

Note that the sound output device described below is provided with a speaker unit as a sound output unit, and a sound guide tube as a path (conduction space) of the sound output from the speaker unit, and in the following description, a front-rear direction, a top-bottom direction, and a left-right direction are defined with an axial direction of the sound guide tube being defined as the left-right direction.

However, the front-rear direction, the top-bottom direction, and the left-right direction described below are defined only for convenience, and they are not limited to the definitions described below when the present technology is embodied.

<Configuration of Sound Output Device>

Figure 1:
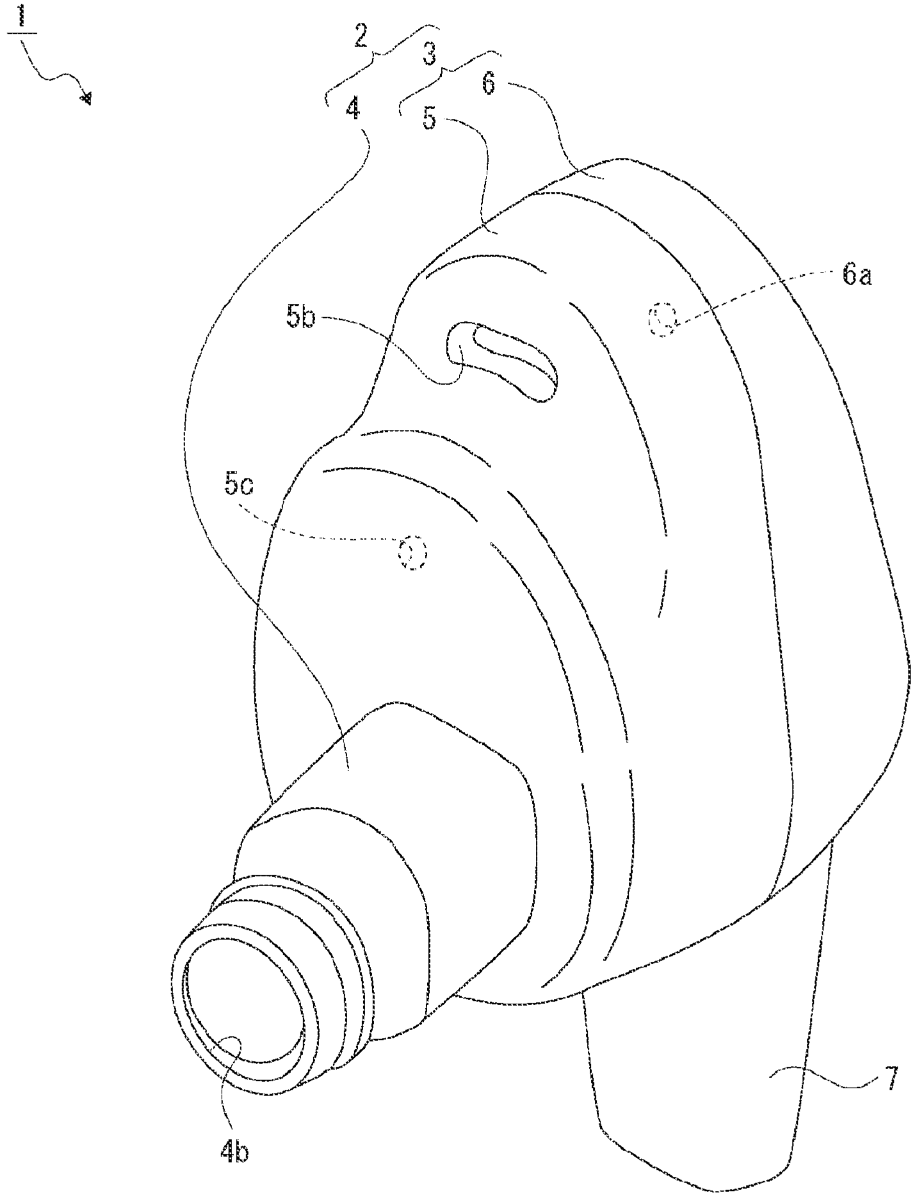
FIG. 1 illustrates an embodiment of a sound output device according to the present technology together with FIGS. 2 to 5, and is a perspective view of the sound output device from which an ear pad is removed.
Figure 2:
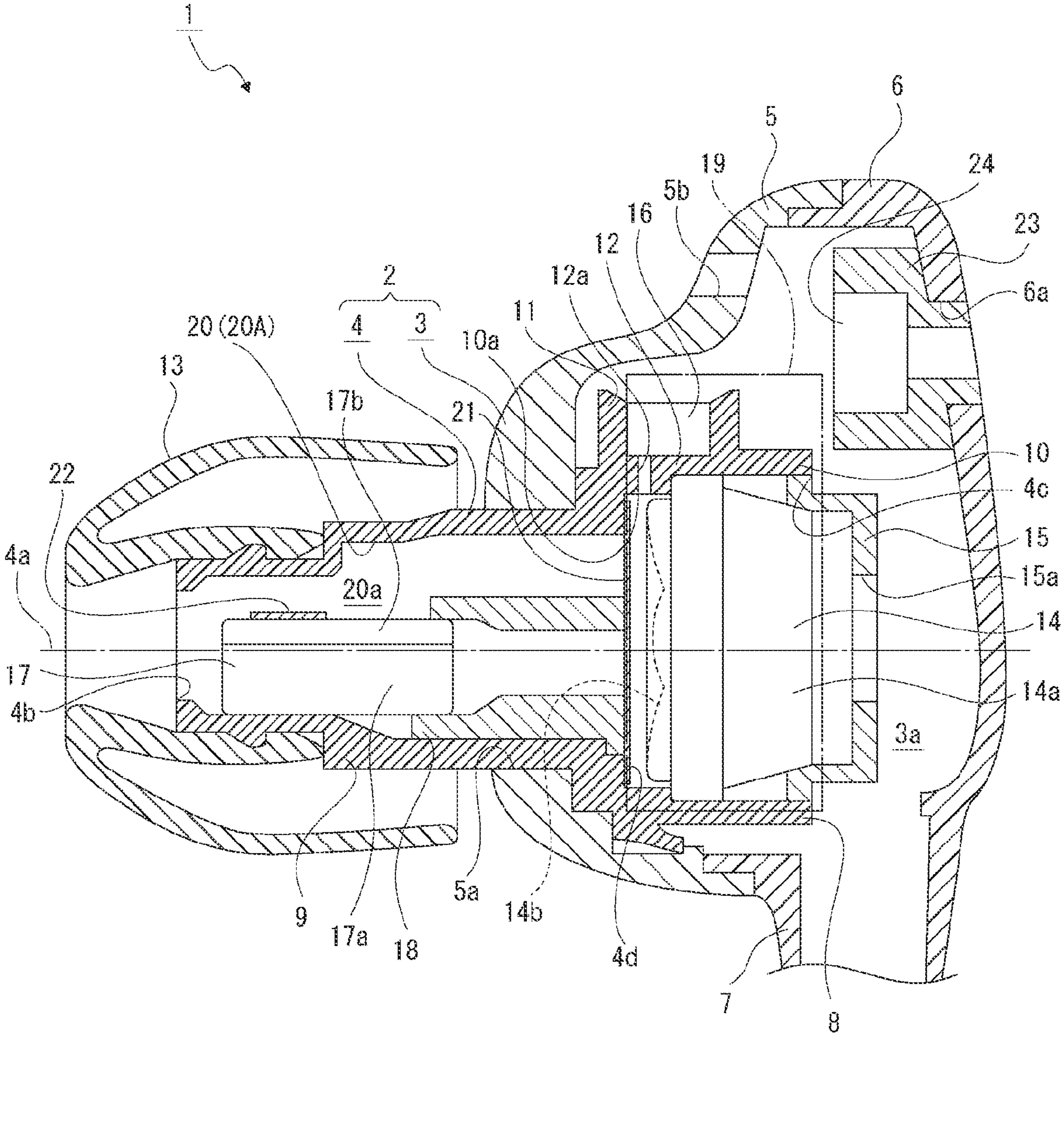
FIG. 2 is a sectional view of the sound output device.

The configuration of a sound output device 1 will be described below (see FIGS. 1 and 2).

The sound output devices 1 are used, for example, as a pair, one for the left ear and the other for the right ear. However, only one sound output device 1 may be used to catch sounds.

The sound output device 1 includes required units provided inside a housing 2, and the housing 2 is obtained by connecting an arrangement case 3 and a sound guide tube 4.

The internal space of the arrangement case 3 is formed as an arrangement space 3*a*. The arrangement case 3 is obtained by connecting an inner case portion 5 and an outer case portion 6 in the left-right direction. The inner case portion 5 has a recessed shape which is open on the outer case portion 6 side, and the outer case portion 6 has a recessed shape which is open on the inner case portion 5 side except for a lower end part.

The inner case portion 5 is formed with an insertion hole 5*a* penetrating in the left-right direction. The inner case portion 5 has a through hole 5*b* that is formed above the insertion hole 5*a* and that penetrates in the left-right direction. The inner case portion 5 has a first input hole 5*c* that is formed between the insertion hole 5*a* and the through hole 5*b* and that penetrates in the front-rear direction.

The outer case portion 6 is formed with a second input hole 6*a* penetrating in the left-right direction.

Filters (not illustrated) are disposed in the through hole 5*b*, the first input hole 5*c*, and the second input hole 6*a*, respectively, and the filters prevent intrusion of dust into the arrangement case 3 from the through hole 5*b*, the first input hole 5*c*, and the second input hole 6*a*.

The lower end part of the outer case portion 6 serve as a tubular cord insertion portion 7. A connection cord (not illustrated) is inserted into the cord insertion portion 7, and input/output of a signal, supply of power, and the like to each unit arranged inside the housing 2 are performed by the connection cord.

The sound guide tube 4 is formed in a substantially cylindrical shape, and has a central axis 4*a* extending in substantially the left-right direction, so that the axial direction substantially coincides with the left-right direction. An opening at the tip of the sound guide tube 4 is formed as a sound output port 4*b*. An opening of the sound guide tube 4 at an end opposite to the sound output port 4*b* is formed as an insertion opening 4*c*. An end part of the sound guide tube 4 opposite to the sound output port 4*b* in the axial direction is provided as a holding portion 8, and a part other than the holding portion 8 is provided as a sound guide portion 9. The sound guide portion 9 has a diameter smaller than that of the holding portion 8.

The sound guide tube 4 is connected to the arrangement case 3 such that the holding portion 8 is placed in the arrangement space 3*a* of the arrangement case 3, and a part of the sound guide portion 9 excluding a part on the holding portion 8 side protrudes from the insertion hole 5*a* to the outside of the arrangement case 3. In the sound guide tube 4, an annular stepped surface facing the insertion opening 4*c* is formed at a boundary between the holding portion 8 and the sound guide portion 9, and this stepped surface is formed as an attachment surface 4*d*.

The holding portion 8 has a speaker holding portion 10 having a recessed shape which is open at the side and a microphone holding portion 11 having a recessed shape which is open at the top. An upper end part of the speaker holding portion 10 and a lower end part of the microphone holding portion 11 are shared. A portion shared by the speaker holding portion 10 and the microphone holding portion 11 is provided as a partition wall 12, and the partition wall 12 is formed with a communication hole 12*a* that vertically passes through the partition wall 12 and that allows communication between a space inside the speaker holding portion 10 and a space inside the microphone holding portion 11.

An ear pad 13 is externally fitted to the tip of the sound guide portion 9 in the sound guide tube 4. The ear pad 13 includes a flexible material such as a rubber material.

A first speaker unit 14 is arranged in the speaker holding portion 10 of the sound guide tube 4. The first speaker unit 14 is a dynamic type speaker unit and includes a cabinet 14*a* and a diaphragm 14*b*. In the cabinet 14*a*, a coil bobbin and a magnetic circuit unit (not illustrated) are arranged. The cabinet 14*a* is formed in a substantially cylindrical shape. In the speaker holding portion 10, the diaphragm 14*b* is located closer to the sound guide portion 9 with respect to the cabinet 14*a* with its outer periphery being fixed to one end of the cabinet 14*a* in the axial direction.

The cabinet 14*a* of the first speaker unit 14 is held by a first speaker holder 15, and the first speaker holder 15 is attached to the speaker holding portion 10. The first speaker holder 15 has a sound emission hole 15*a* penetrating in the left-right direction. In a state where the first speaker holder 15 is attached to the speaker holding portion 10, the insertion opening 4*c* of the speaker holding portion 10 is closed by the first speaker holder 15.

When a sound is output from the first speaker unit 14, the sound output from the back side of the first speaker unit 14, that is, the side opposite to the diaphragm 14*b*, is emitted to the outside from the through hole 5*b* via the sound emission hole 15*a*. In addition, air present near the diaphragm 14 is also discharged from the through hole 5*b*.

A feedback microphone 16 is disposed in the microphone holding portion 11. External sounds (noise) are input to the feedback microphone 16 through the first input hole 5*c*.

A second speaker unit 17 is disposed inside the sound guide portion 9 of the sound guide tube 4. The second speaker unit 17 is a balanced armature speaker unit, and includes an accommodation case 17*a*, a cover 17*b*, and a sound output unit (not illustrated). Note that the second speaker unit 17 may be a dynamic speaker unit.

The accommodation case 17*a* is formed in a box shape opened in at least one direction. The cover 17*b* is attached to an upper end part of the accommodation case 17*a* and closes a space inside the accommodation case 17*a*. The cover 17*b* is formed with a sound output hole (not illustrated) vertically passing through the cover 17*b*. The sound output unit is housed inside the accommodation case 17*a*, and includes a coil, a magnet, a diaphragm, and the like.

One end of the second speaker unit 17 in the left-right direction is held by a second speaker holder 18, and the second speaker holder 18 is attached to the sound guide portion 9.

In the housing 2, a space in which the first speaker unit 14 and the feedback microphone 16 are arranged is defined as a first space 19, and a space in which the second speaker unit 17 is arranged is defined as a second space 20. The second space 20 also functions as a conduction space 20A in which the sound output from the first speaker unit 14 and the sound output from the second speaker unit 17 are guided toward the sound output port 4*b*.

In the sound output device 1, the first speaker unit 14 and the second speaker unit 17 are arranged apart from each other in the axial direction of the sound guide tube 4, and the first speaker unit 14 and the feedback microphone 16 are arranged apart from each other in the direction perpendicular to the axial direction of the sound guide tube 4.

A first equalizer 21 is attached to the attachment surface 4*d* of the sound guide tube 4, and the first equalizer 21 is positioned to face the diaphragm 14*b* of the first speaker unit 14. The first equalizer 21 has a function of applying a predetermined acoustic load resistance to each of the first speaker unit 14 and the feedback microphone 16, and is formed as, for example, a mesh-shaped thin film oriented in the left-right direction.

Since the first equalizer 21 is attached to the attachment surface 4*d* of the sound guide tube 4, the first equalizer 21 is located between the first speaker unit 14 and the second speaker unit 17, and the first space 19 and the second space 20 are partitioned by the first equalizer 21. In a state where the first equalizer 21 is provided inside the sound guide tube 4, a space 10*a* is formed between the first equalizer 21 and the diaphragm 14*b* of the first speaker unit 14, and the space 10*a* and the communication hole 12*a* communicate with each other.

In a state where the second speaker unit 17 is arranged in the second space 20, a space is formed at least above the second speaker unit 17 in the second space 20, and this space serves as a sound output path 20*a* of sound. The sound output from the first speaker unit 14 and the sound output from the second speaker unit 17 pass through the sound output path 20*a* and are output toward the ear via the ear pad 13.

A second equalizer 22 is attached to the upper surface of the cover 17*b* of the second speaker unit 17 so as to cover the sound output hole. The second equalizer 22 has a function of applying a predetermined acoustic load resistance to the second speaker unit 17, and is formed as, for example, a mesh-shaped thin film oriented in the left-right direction.

A feedforward microphone 24 is arranged in the arrangement space 3*a* of the arrangement case 3 while being held by a microphone holder 23. The feedforward microphone 24 is disposed in an upper part of the arrangement space 3*a* and is positioned corresponding to the second input hole 6*a*.

In the sound output device 1, the sound output band of the first speaker unit 14 is, for example, 5 Hz to 8 KHz, and the sound output band of the second speaker unit 17 is, for example, 8 KHz or more. The first speaker unit 14 has a low-frequency sound output function, and the second speaker unit 17 has a high-frequency sound output function. In addition, the sound output device 1 executes a noise canceling function.

Specifically, a signal having a phase inverted with respect to noise input to the feedback microphone 16 is generated, and the second speaker unit 17 is connected to the signal having the inverted phase.

As described above, the sound output device 1 includes the feedback microphone 16 provided at a position close to the ear, and executes the feedback noise canceling function to reduce noise by generating a signal having a phase inverted with respect to the noise input to the feedback microphone 16.

Furthermore, the sound output device 1 is also configured to be able to execute a feedforward noise canceling function to reduce noise by providing the feedforward microphone 24 on the outer periphery of the housing 2 and performing appropriate filtering processing on the noise input to the feedforward microphone 24.

<Operation of Sound Output Device>

As described above, in the sound output device 1, the first speaker unit 14 and the feedback microphone 16 are arranged in the first space 19, the second speaker unit 17 is arranged in the second space 20, the first equalizer 21 is arranged between the first speaker unit 14 and the second speaker unit 17, and the first space 19 and the second space 20 are partitioned by the first equalizer 21.

Therefore, when the noise canceling function is executed in the sound output device 1, the first equalizer 21 prevents input of sound to the feedback microphone 16 from the second speaker unit 17 connected to the signal with an inverted phase generated with respect to the noise input to the feedback microphone 16. As a result, sound unnecessary for execution of noise canceling is not input to the feedback microphone 16 from the second speaker unit 17, whereby the noise canceling function is appropriately executed.

SUMMARY

As described above, in the sound output device 1, the first space 19 and the second space 20 are formed inside the housing 2, the feedback microphone 16 and the first speaker unit 14 are arranged in the first space 19, the second speaker unit 17 is arranged in the second space 20, and the first equalizer 21 that partitions the first space 19 and the second space 20 is arranged between the first speaker unit 14 and the second speaker unit 17.

Therefore, when the noise canceling function is executed in the sound output device 1, the input of sound from the second speaker unit 17 to the feedback microphone 16 is prevented by the first equalizer 21. Thus, the noise canceling function is appropriately executed, and the performance of the noise canceling function can be improved.

In addition, since the first speaker unit 14 and the feedback microphone 16 are spatially separated from the second equalizer 17 by the first equalizer 21, it is possible to separately set the acoustic load resistance to each of the first speaker unit 14, the feedback microphone 16, and the second equalizer 17, whereby the sound quality in the sound output device 1 can be improved.

Further, since the second speaker unit 17 is arranged in the conduction space 20A that is the internal space of the sound guide tube 4 and that functions as a sound conduction path, it is not necessary to form a dedicated space for arranging the second speaker unit 17 inside the housing 2, whereby the sound output device 1 can be downsized.

Furthermore, since the feedback microphone 16 and the first speaker unit 14 are held by the sound guide tube 4, it is not necessary to provide separate members for respectively holding the feedback microphone 16 and the first speaker unit 14, whereby the number of components of the sound output device 1 can be reduced, and the sound output device 1 can be downsized.

In addition, the sound guide tube 4 is provided with the partition wall 12 between the feedback microphone 16 and the first speaker unit 14, the partition wall 12 is formed with the communication hole 12*a* that allows communication between the feedback microphone 16 and the first speaker unit 14, and the communication hole 12*a* penetrates in a direction perpendicular to the axial direction of the sound guide tube 4.

Therefore, the direction in which the communication hole 12*a* penetrates and the direction in which the conduction space 12A extends are perpendicular to each other, which prevents the sound guide tube 4 from being excessively long in one direction. Thus, the sound output device 1 can further be downsized.

Further, since the first speaker unit 14 and the second speaker unit 17 are arranged apart from each other in the axial direction of the sound guide tube 4, the first speaker unit 14 and the second speaker unit 17 are positioned apart from each other in the axial direction of the sound guide tube 4 inside the sound guide tube 4. Therefore, the space inside the sound guide tube 4 is effectively used, whereby the sound output device 1 can be further downsized.

Furthermore, the first speaker unit 14 and the feedback microphone 16 are arranged apart from each other in the direction perpendicular to the axial direction of the sound guide tube 4.

Therefore, due to the configuration in which the first speaker unit 14 and the second speaker unit 17 are positioned apart from each other in the axial direction of the sound guide tube 4, and the first speaker unit 14 and the feedback microphone 16 are positioned apart from each other in the direction perpendicular to the axial direction of the sound guide tube 4, the first speaker unit 14, the second speaker unit 17, and the feedback microphone 16 are not aligned in one direction, which prevents the sound guide tube 4 from being excessively long in one direction. Therefore, the sound output device 1 can be further downsized.

In addition, since the diaphragm 14*b* of the first speaker unit 14 and the first equalizer 21 are positioned to face each other, an increase in size of the sound guide tube 4 in the direction in which the diaphragm 14*b* and the first equalizer 21 are arranged can be prevented, whereby the sound output device 1 can be further downsized.

Note that, although an example in which the first equalizer 21 is attached to the attachment surface 4*d* of the sound guide tube 4 and the first speaker unit 14 and the second speaker unit 17 are spatially separated has been described above, the first equalizer 21 may be arranged in, for example, the sound output path 20*a*, and the first speaker unit 14 and the second speaker unit 17 may be spatially separated by the first equalizer 21.

<Others>

Hereinafter, configuration examples of arrangement positions of the first speaker unit 14, the feedback microphone 16, and the second speaker unit 17 will be described (see FIGS. 3 to 5).

Figure 3:
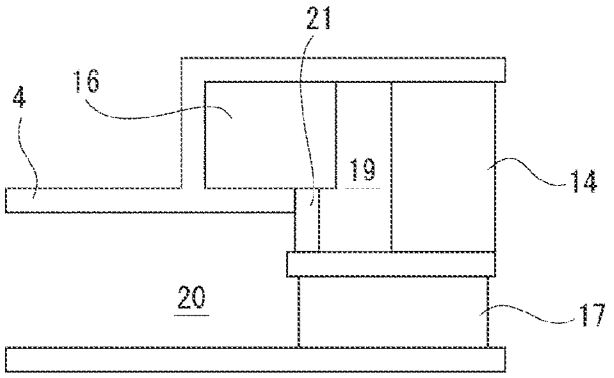
FIG. 3 is a conceptual diagram illustrating a first configuration example of arrangement positions of a first speaker unit, a second speaker unit, and a feedback microphone.

In a first configuration example of arrangement position, as illustrated in FIG. 3, the first speaker unit 14 and the second speaker unit 17 are arranged apart from each other in the direction perpendicular to the axial direction of the sound guide tube 4, the first speaker unit 14 and the feedback microphone 16 are arranged apart from each other in the axial direction of the sound guide tube 4, and the feedback microphone 16 is arranged closer to the sound output port 4*b* of the sound guide tube 4 with respect to the first speaker unit 14. The first speaker unit 14 and the feedback microphone 16 are arranged in the first space 19, the second speaker unit 17 is arranged in the second space 20, and the first space 19 and the second space 20 are partitioned by the first equalizer 21.

Figure 4:
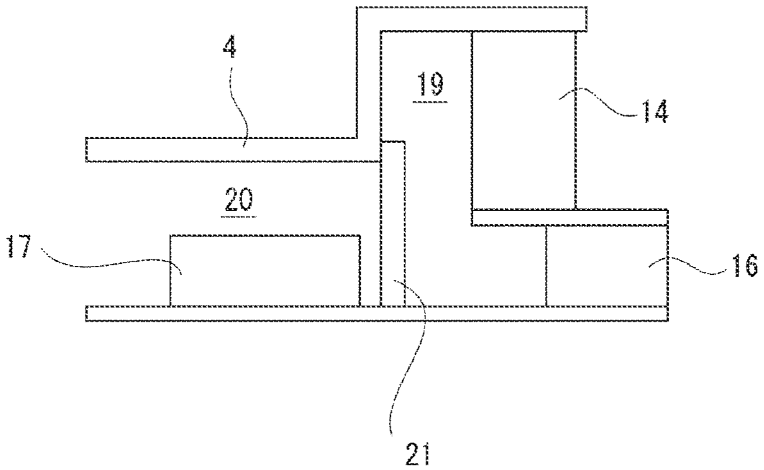
FIG. 4 is a conceptual diagram illustrating a second configuration example of arrangement positions of the first speaker unit, the second speaker unit, and the feedback microphone.

In a second configuration example of arrangement position, as illustrated in FIG. 4, the second speaker unit 17 and the feedback microphone 16 are arranged apart from each other in the axial direction of the sound guide tube 4, the first speaker unit 14 and the feedback microphone 16 are arranged apart from each other in the direction perpendicular to the axial direction of the sound guide tube 4, and the second speaker unit 17 is arranged closer to the sound output port 4*b* of the sound guide tube 4 with respect to the first speaker unit 14 and the feedback microphone 16 (see FIG. 4). The first speaker unit 14 and the feedback microphone 16 are arranged in the first space 19, the second speaker unit 17 is arranged in the second space 20, and the first space 19 and the second space 20 are partitioned by the first equalizer 21.

Figure 5:
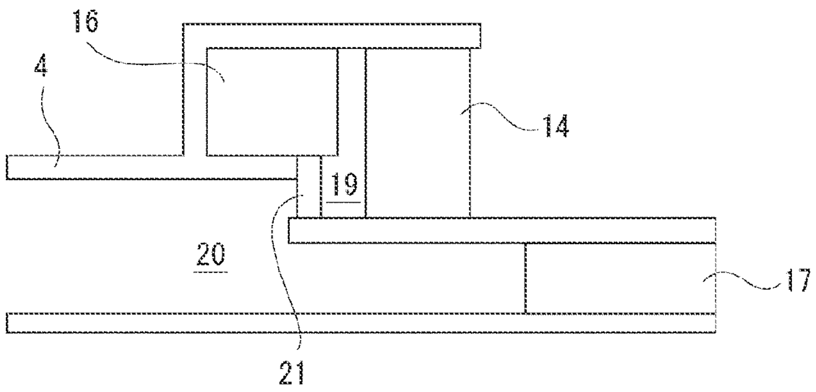
FIG. 5 is a conceptual diagram illustrating a third configuration example of arrangement positions of the first speaker unit, the second speaker unit, and the feedback microphone.

In a third configuration example of arrangement position, as illustrated in FIG. 5, the first speaker unit 14 and the feedback microphone 16 are arranged apart from each other in the axial direction of the sound guide tube 4, the first speaker unit 14 and the second speaker unit 17 are arranged apart from each other in the direction perpendicular to the axial direction of the sound guide tube 4, and the first speaker unit 14 and the feedback microphone 16 are arranged closer to the sound output port 4*b* of the sound guide tube 4 with respect to the second speaker unit 17. The first speaker unit 14 and the feedback microphone 16 are arranged in the first space 19, the second speaker unit 17 is arranged in the second space 20, and the first space 19 and the second space 20 are partitioned by the first equalizer 21.

<Present Technology>

The present technology may also have the following configurations.

(1)

A sound output device including:

a housing that includes an arrangement case in which an internal space is formed, and a sound guide tube in which a sound conduction space is formed;

a feedback microphone to which an external sound is input;

a first speaker unit that outputs a sound; and a second speaker unit that outputs a sound in an output band different from an output band of the sound output from the first speaker unit, in which the housing has inside a first space and a second space, the feedback microphone and the first speaker unit are arranged in the first space, the second speaker unit is arranged in the second space, and an equalizer that partitions the first space and the second space is disposed between the first speaker unit and the second speaker unit.

(2)

The sound output device according to (1) described above, in which the second speaker unit is arranged in the conduction space.

(3)

The sound output device according to (1) or (2) described above, in which the feedback microphone and the first speaker unit are held by the sound guide tube.

(4)

The sound output device according to (3) described above, in which the sound guide tube is provided with a partition wall between the feedback microphone and the first speaker unit, the partition wall is formed with a communication hole that allows communication between the feedback microphone and the first speaker unit, and the communication hole penetrates in a direction perpendicular to an axial direction of the sound guide tube.

(5)

The sound output device according to (4) described above, in which the first speaker unit and the second speaker unit are arranged apart from each other in the axial direction of the sound guide tube.

(6)

The sound output device according to (5) described above, in which the first speaker unit and the feedback microphone are arranged apart from each other in the direction perpendicular to the axial direction of the sound guide tube.

(7)

The sound output device according to any one of (1) to (6) described above, in which a diaphragm of the first speaker unit and the equalizer are positioned to face each other.

REFERENCE SIGNS LIST

1 Sound output device
2 Housing
3 Arrangement case
4 Sound guide tube
12 Partition wall
12*a* Communication hole
14 First speaker unit
14*b* Diaphragm
16 Feedback microphone
17 Second speaker unit
19 First space
20 Second space
20A Conduction space
21 First equalizer

The invention claimed is:

1. A sound output device, comprising:

a housing that includes an arrangement case in which an internal space is formed, and a sound guide tube in which a sound conduction space is formed;

a feedback microphone to which an external sound is input;

a first speaker unit configured to output a sound; and a second speaker unit configured to output a sound in an output band different from an output band of the sound output from the first speaker unit, wherein the housing has inside a first space and a second space, the feedback microphone and the first speaker unit are arranged in the first space, the second speaker unit is arranged in the second space, and an equalizer that partitions the first space and the second space is disposed between the first speaker unit and the second speaker unit.

2. The sound output device according to claim 1, wherein the second speaker unit is arranged in the sound conduction space.

3. The sound output device according to claim 1, wherein the feedback microphone and the first speaker unit are held by the sound guide tube.

4. The sound output device according to claim 3, wherein the sound guide tube is provided with a partition wall between the feedback microphone and the first speaker unit, the partition wall is formed with a communication hole configured to allow communication between the feedback microphone and the first speaker unit, and the communication hole penetrates in a direction perpendicular to an axial direction of the sound guide tube.

5. The sound output device according to claim 4, wherein the first speaker unit and the second speaker unit are arranged apart from each other in the axial direction of the sound guide tube.

6. The sound output device according to claim 5, wherein the first speaker unit and the feedback microphone are arranged apart from each other in the direction perpendicular to the axial direction of the sound guide tube.

7. The sound output device according to claim 1, wherein a diaphragm of the first speaker unit and the equalizer are positioned to face each other.

* * * * *